Feb. 6, 1951 C. S. HAZARD ET AL 2,540,617
AUTOMATIC BILLING MACHINE FOR LIQUID DISPENSERS
Filed June 26, 1942 5 Sheets-Sheet 5

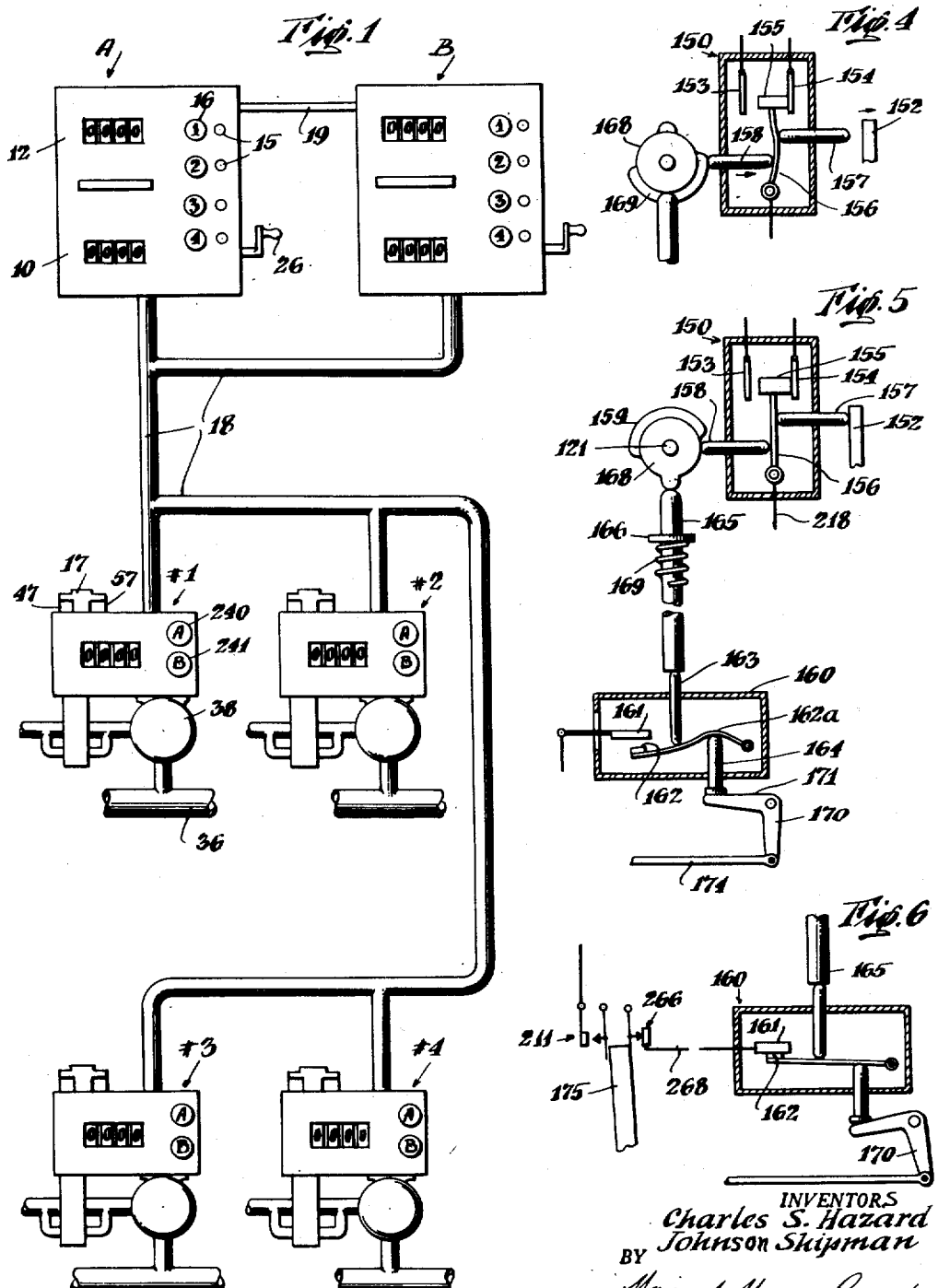

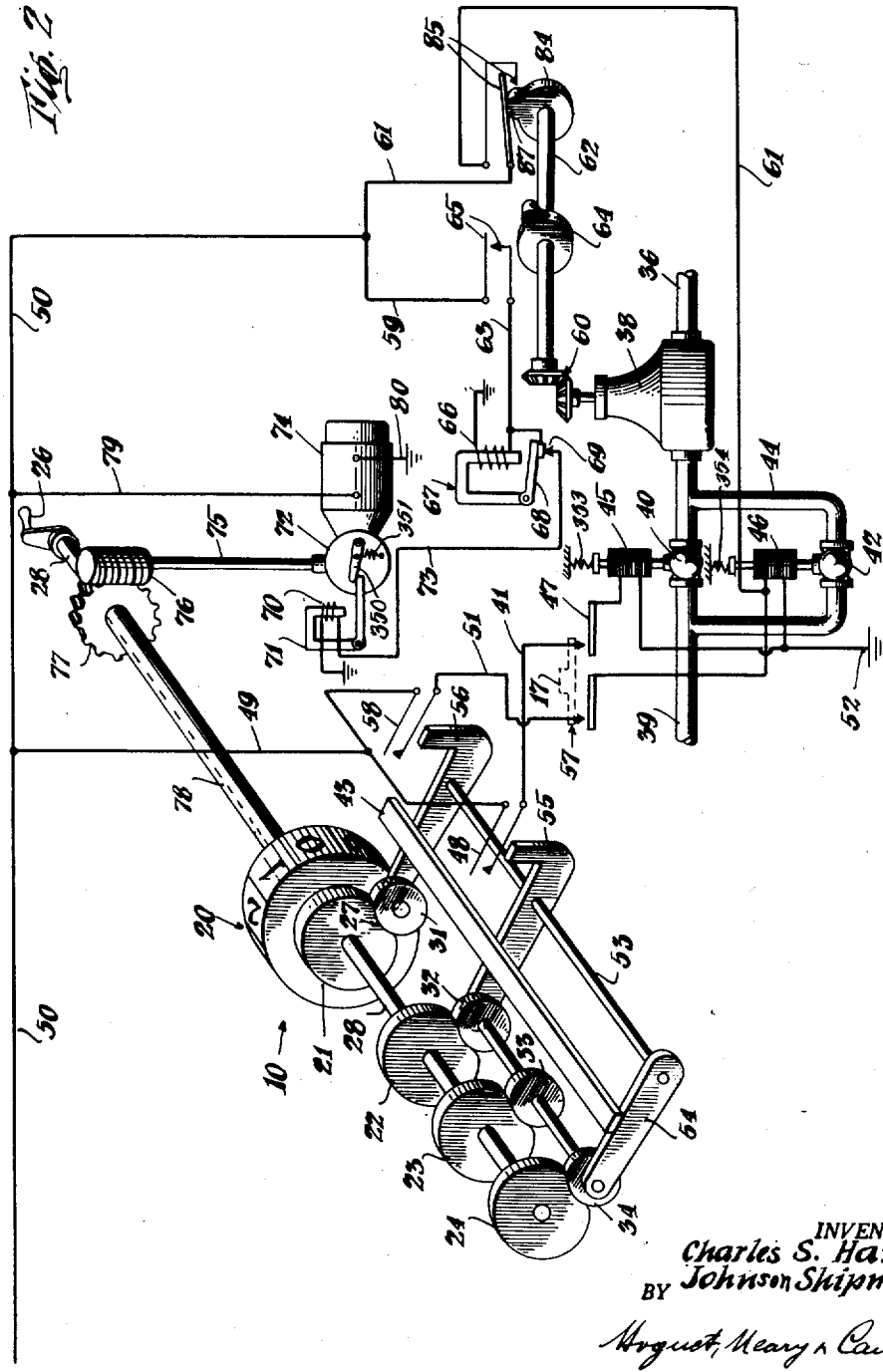

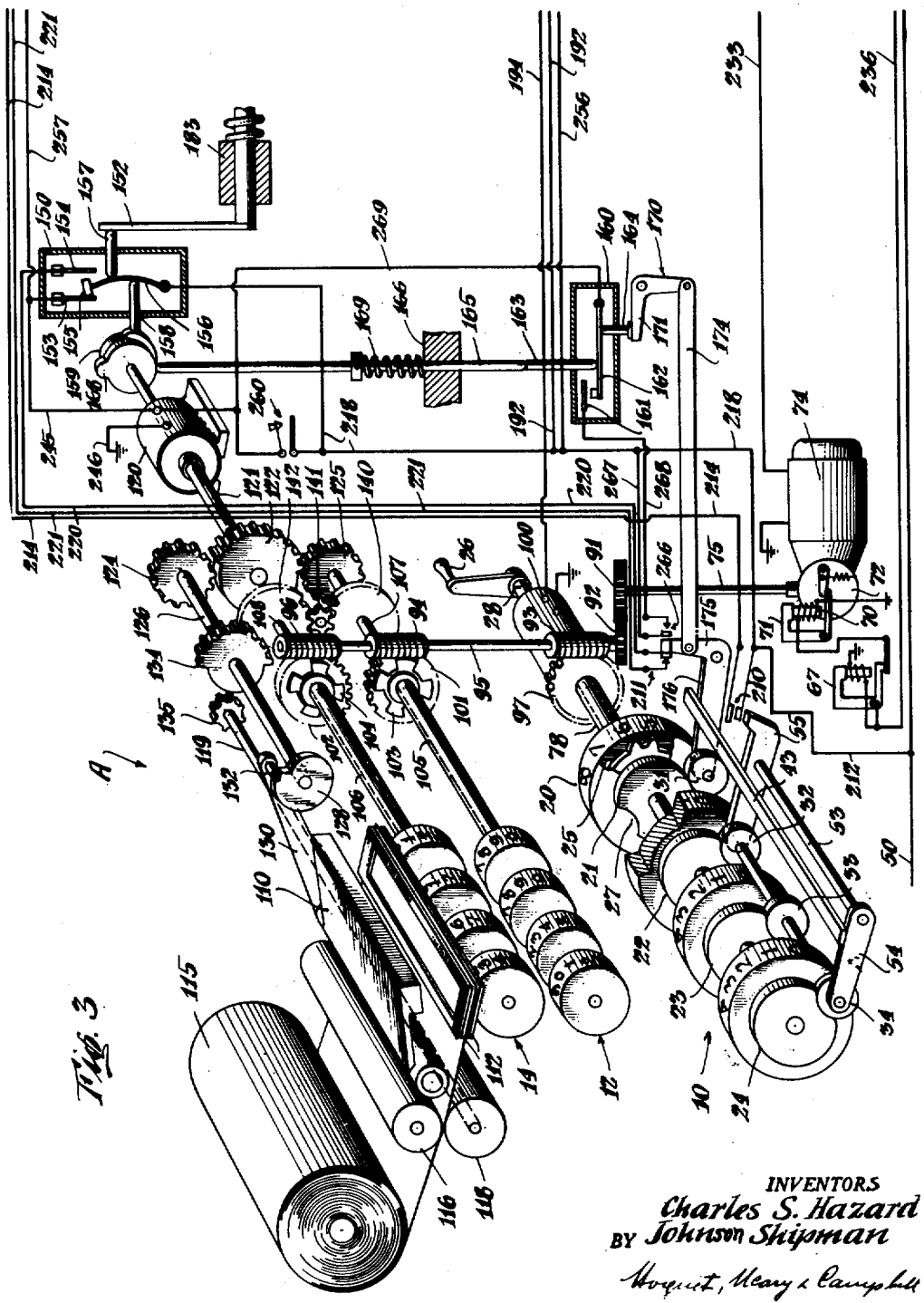

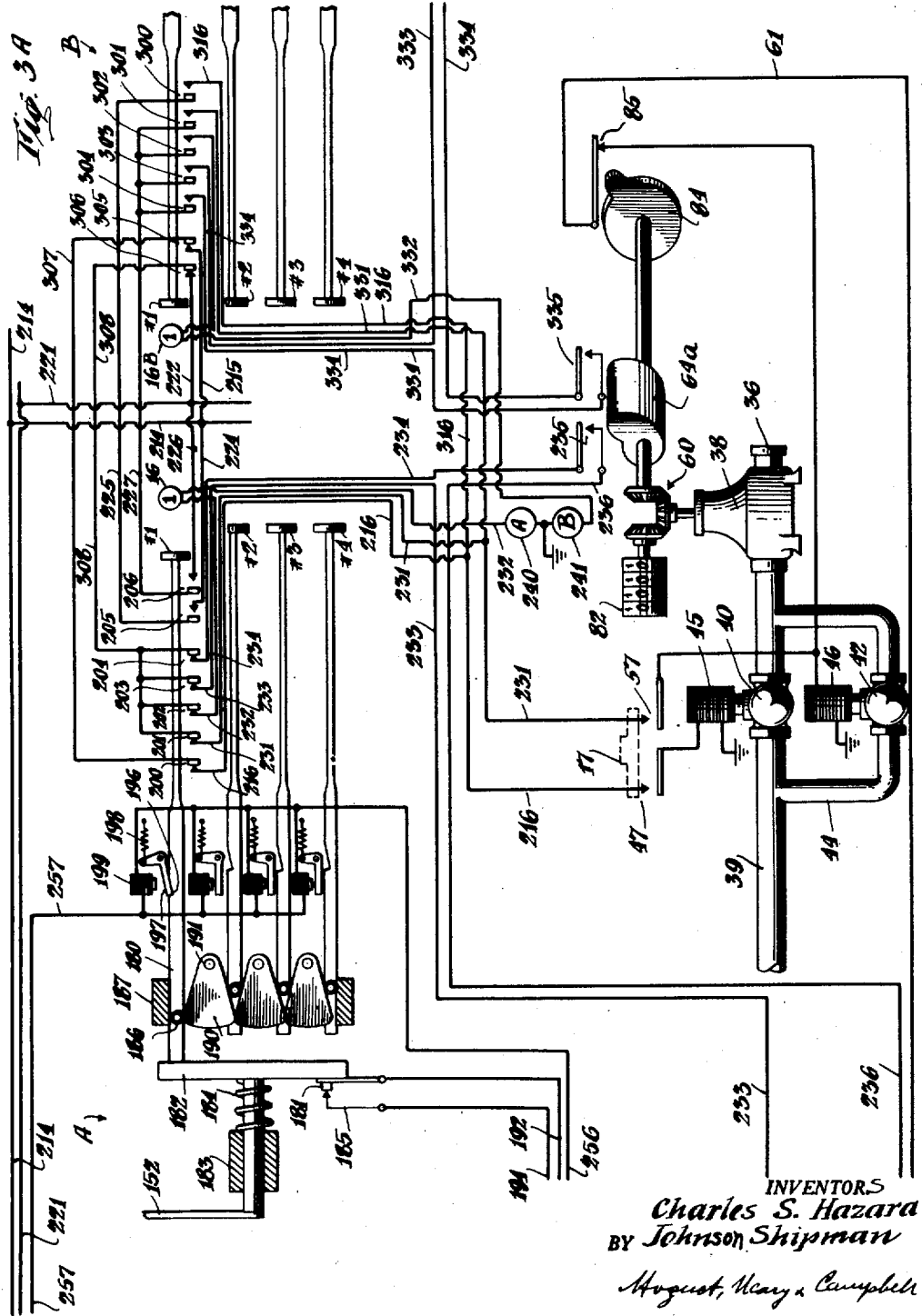

INVENTORS
Charles S. Hazard
BY Johnson Shipman
George H. Corey
ATTORNEY

Patented Feb. 6, 1951

2,540,617

UNITED STATES PATENT OFFICE 2,540,617

AUTOMATIC BILLING MACHINE FOR LIQUID DISPENSERS

Charles S. Hazard, Andover, N. J., and Johnson Shipman, Flushing, N. Y., assignors to Neptune Meter Company, a corporation of New Jersey Application June 26, 1942, Serial No. 448,644

10 Claims. (Cl. 222—20)

This invention relates to dispensing apparatus and more particularly to means for automatically recording and billing amounts dispensed at a plurality of loading stations.

One of the objects of this invention is to provide one or more registers or billing machines to be located at a central point and operable to control or selectively control and register the dispensing of material at one or a plurality of loading stations which may be remotely located relative to the billing machines.

Another object of this invention is to provide a control for measuring devices so that delivery in unit measurements is assured regardless of when during a unit measurement discontinuance of delivery is initiated.

Still another object of this invention is to provide a control for an auto-stop register operable to register unit measurements at a time interval prior to the completion of the unit measurements and when the last unit of a predetermined amount has been registered to effect discontinuance of delivery at substantially the completion of the last unit of measurement.

A still further object of this invention is to provide an auto-stop control for dispensing systems wherein the rate of delivery is first reduced near the end of a predetermined dispensing operation and then the reduced operation cut off at the completion of the operation.

A further important object of the invention is to provide an electrical system for controlling the dispensing of a material through a measuring device and the registation on a register of the amount so dispensed, the register being remotely located with respect to the meter.

Another object of the invention is to provide in such an electrical system for operation of the register concomitantly with operation of the meter but also to secure the precise cut off of delivery of material being dispensed upon completion of the last unit of measurement.

The foregoing and other objects of this invention are accomplished by providing one or more billing machines at a central point which are selectively connectible to any one of a plurality of measuring devices which may be remotely located with respect to such central point. Each billing machine comprises a presettable auto-stop register and printing mechanism operable at the end of a predetermined operation to issue a ticket with the amount dispensed indicated thereon. If desired, the machine may include a visual register to indicate the amounts being delivered. For automatic operation a motor may be provided to reset the printing elements and return the visual register to zero. For remote control the billing machine may have a power drive adapted to be controlled by the measuring device to which the machine is connected.

The selective feature of the invention comprises the provision of a plurality of manually actuatable elements or buttons for each billing machine. Each button has a plurality of contacts which, when closed, electrically connect the machine to a measuring device which corresponds to the button actuated. The buttons of each machine are provided with interlocking means whereby only one button of a machine can be actuated at a time. Interlocking means are also provided between the corresponding buttons of the billing machines where more than one machine is provided so that the same measuring device cannot be connected to more than one billing machine at a time. When a selective button is pressed, it effects preparatory conditioning of the billing machine, that is to say, it sets parts in motions to reset the register and printing elements of the machine.

An suitable measuring devices may be used in the system depending upon the nature and form of the material that is to be dispensed or otherwise measured and handled. Where the material to be handled is in fluid form, each measuring device may comprise a suitable fluid meter and one or more delivery controlling elements such as valves. More than one valve may be used where reduced flow is desired prior to the final cut-off operation. A cam or other suitable driven element is connected to the meter shaft to actuate contacts in an electric circuit for unit driving operation of the registering parts of the machine.

The metering apparatus is provided with a unit measurement synchronizing feature whereby unit measurements are assured regardless of when during a unit measurement discontinuance of delivery is initiated, whether manually or automatically by the machine. This feature in preferred embodiment includes a synchronizing circuit connected in parallel with a main control circuit, the synchronizing circuit being deenergized momentarily at the end of each unit or cyclic operation of the meter while the main circuit is under control of the auto-stop portion of the machine. A manually controlled switch may also be provided in the main circuit so that the driver of the vehicle receiving the commodity dispensed or an attendant may initiate discontinuance of delivery.

A time differential is provided between the register driving operation of the machine and the cyclic deenergization of the synchronizing circuit. This relationship enables the machine, when a predetermined amount has been registered, to initiate discontinuance of the delivery prior to the completion of the last unit of measurement. The cyclic deenergization of the synchronizing circuit lags behind the machine registration so that when the machine deenergizes the main control circuit to the valve, the valve will not close immediately but will remain open until the synchronizing circuit is deenergized by the meter at the completion of unit measurement.

This synchronizing unit measurement of the material dispensed, whereby cut-off can only be effected at the completion of a unit measurement, is important for accurate recording and delivery. Where the unit measurement of systems heretofore provided is registered after actual measurement and therefore prior to a machine operation effecting discontinuance of the delivery, the resulting lag in the cut-off operation introduces error. Attempts have been made to overcome this error by adjusting the tripping operation of the register ahead of the completion of the last unit of measurement. Such adjustment, however, is very difficult to achieve accurately on existing machines and is not reliable because the required adjustment would have to be varied in accordance with the rate of delivery.

For a better understanding of the invention, reference may be had to the following detailed description which is to be read in connection with the accompanying drawings, in which:

Fig. 1 is a diagrammatical illustration of a dispensing system according to this invention;

Fig. 2 is a schematic illustration of a portion of the system showing a simplified connection between a fluid meter and an auto-stop register;

Figs. 3 and 3A are schematical views which when combined show a complete billing machine coupled with a dispensing station together with a part of the selecting mechanism of a second billing machine to indicate the interlocking controls between a plurality of such machines;

Fig. 4 is a vertical cross-sectional view of the upper control switch shown in Fig. 3 and illustrating a position of the parts thereof prior to the initiation of a dispensing operation;

Figure 7:
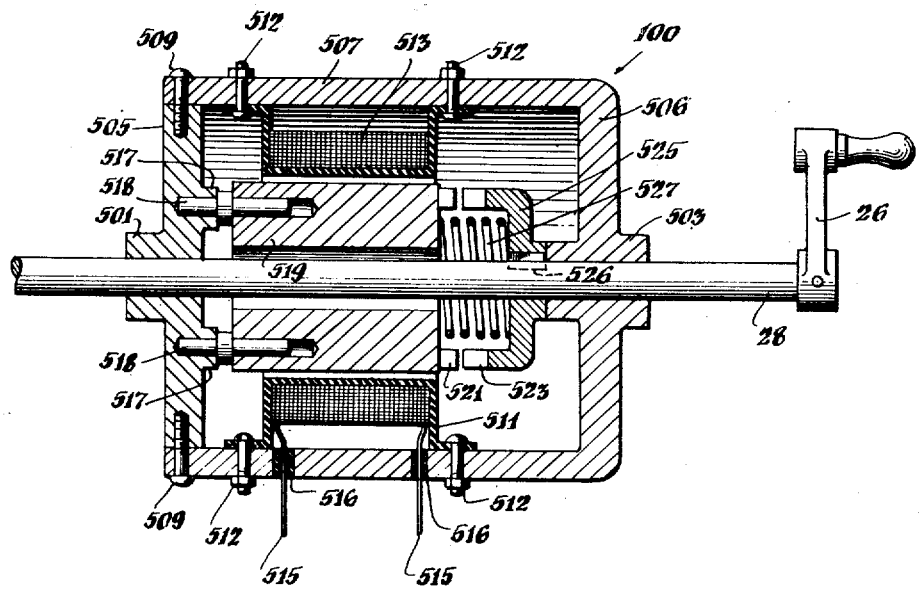

Fig. 5 is a vertical cross-sectional view of the upper and lower control switches of Fig. 3 indicating the positioning of the parts thereof after a dispensing operation has been initiated; and Fig. 6 is a vertical cross-sectional view of the lower control switch of Figs. 3 and 5, showing the parts thereof in the position to which they are moved by the auto-stop register at the end of a predetermined dispensing operation.

Fig. 7 shows in longitudinal section the construction of one embodiment of the device for locking the auto-stop register.

Referring to Figs. 1, 3 and 3A of the drawings, two billing machines A and B are shown associated with four dispensing or loading stations #1, #2, #3 and #4 of the type employed in distributing gasoline and other liquid petroleum products. Each billing machine is provided with an auto-stop register 10, a visual register 12, series of printing wheels 14 and associated printing and controlling mechanisms. Selecting apparatus is also provided for each machine and includes a set of buttons 15, one for each of the dispensing or loading stations of the system.

As shown in Fig. 1, each billing machine of the system therein illustrated has four buttons together with lamps 16 suitably numbered or colored to represent the particular loading station with which the button adjacent thereto is associated. When one of the buttons is pressed, the adjacent lamp is illuminated as soon as the connection to the corresponding station is effected and remains illuminated until the dispensing operation is completed.

As described more fully hereinafter, the actuation of one of the buttons 15 will connect the billing machine thereof through electric circuit contained in the cable 18 to the loading station which corresponds to the button pressed. For example, should button #1 be pressed on machine A, the machine A will be connected to the loading station #1 and the liquid or other material dispensed at station #1 will be registered for recording and billing purposes on the machine A. When one of the buttons, such as the button #1 has been pressed on machine A, locking means hereinafter described interlock the buttons and prevent other buttons on the machine A from being pressed. Interlocking circuits indicated by the cable 19 are provided between the several billing machines of the system so that when a button has been pressed on one machine, the pressing of or attempts to press the corresponding buttons on other billing machines of the system will be ineffective. Thus, only one billing machine can be connected to a given loading station at one time. Any billing machine, however, which is not already connected to some loading station, may be selected for connection to any loading station that is not at the time connected to a billing machine.

Referring now to Fig. 2 of the drawings, the driving and controlling relationship between the auto-stop register 10 of a billing machine and a measuring device at a loading station will be described to better emphasize several of the novel features of the invention.

The auto-stop register 10 which is shown in more detail in Fig. 3, comprises a series of number wheels in which the units wheel 20 has associated therewith a cam 21, the tens wheel has a cam 22, the hundreds wheel has a cam 23 and the thousands wheel has a cam 24. It will be understood, of course, that any suitable transfer mechanism, such as the usual Geneva gearing partially indicated at 25, may be provided between adjacent number wheels so that a complete rotation of the number wheel of lower order will effect an advance movement of one step to the next adjacent number wheel of higher order. The number wheels of the auto-stop register may be preset by any suitable known mechanism, the presetting being made manually by a handle 26 and shaft 28. Thus preset, the number wheels of the register 10 indicate the amount desired for a dispensing operation.

When the auto-stop register is preset to a desired number, the cams 21, and, if the amount to be dispensed is great enough, also cams 22 to 24, as the case may be, will be moved so as to dislodge from the recesses 27 thereof the followers 31, 32, 33 and 34. In Fig. 2 the auto-stop register is shown in zero position with all of the followers received in the recesses 27 of the cams. In Fig. 3 the auto-stop register is shown preset with the units wheel displaying the number 5 and the higher order wheels still at zero positions. The follower 31 is prevented from entering the recess 27 of the units wheel until after the followers carried upon the rack 54 pivoted at 53 have entered the recesses of the cams 22, 23 and 24. This restriction upon the follower 31 is accomplished by an extension bar 43 of the rack 54 which overlies the arm 56 which supports the follower 31.

The loading station may comprise any suitable source of supply, such as a pipe 36, as in the case of a liquid dispensing system, and a suitable measuring device, such as a meter 38. As shown in Fig. 3a, a delivery pipe 39 is connected to the discharge side of the meter 38 and is provided with a main valve 40 and a bypass connection 44 having an auxiliary valve 42.

While two valves are shown in the present illustration, it will be understood that one valve only may be used. The purpose of the two valves in the system illustrated is to reduce the flow of liquid near the end of a predetermined dispensing operation and then to cut off the reduced flow at precisely the end of the last unit of measurement.

This control of the valves is performed by electrical circuits associated with the followers of the auto-stop register and a synchronizing circuit controlled by the meter. The main valve 40 has associated therewith an electro-magnetic coil 45 and the auxiliary valve 42 has an electro-magnetic coil 46. These coils when energized are adapted to operate in a conventional manner, to move the respective stems and to move the valve discs from the valve seats against bias means contained within the valves, Fig. 3A, or provided by compression springs 353 and 354 bearing against abutments and against the upper ends of the valve stems extended through the coils 45, 46, Fig. 2, to effect opening of the valves 40, 42. Upon deenergization of the coils 45, 46 the respective valves close under the action of the bias mean. The coil 45 is connected by a circuit 41 in series with a manually controlled switch 47 and register controlled contacts 48 to a wire 49 leading from a source of power 50. The other end of the circuit 41 is connected to ground at 52. The coil 46 is connected between the source 50 and the ground 52 by a circuit 51 which includes in series a manual switch 57 and contacts 58 controlled by the follower of the units wheel 20. A single manually actuatable member 17 is provided for both of the switches 47 and 57 so that when it is desirable to start delivery, both of the valves 40 and 42 will be opened simultaneously.

When the cams 22, 23 and 24 of the number wheels of order higher than the units wheel 20 have been returned to zero in response to initiation of a dispensing operation the followers 32, 33 and 34 will move into the recesses of the cams and cause the follower rack 54 to rotate clockwise about the shaft 53 to the position shown, whereby the arm 55 opens the contacts 48. Assuming that the manually actuatable switches 47 and 57 are held closed, either manually or by any suitable latch, the opening of the contacts 48 will deenergize the coil 45 to close the main valve 40. This will reduce the flow through the meter 38, the flow thereafter being under control of the auxiliary valve 42. When the units wheel 20 reaches zero the follower 31 will move into the recess 27 of the cam 21 and the resulting movement of the arm 56 will cause a separation of the contacts 58. Since contacts 58 in the circuit 51 are connected in series with the manual valve control switch 57, wire 49 from the source of current 50 and the coil 46, the opening of the contacts 58 would normally deenergize the coil 46 and close the auxiliary valve 42. The final closing of the valve 42, however, is controlled in cooperation with the circuit 51 by a synchronizing circuit 61 to be hereinafter described.

The driving relation between the meter 38 and the auto-stop register 10 is electrical so that the auto-stop register may be located at a central office remote from the meter. This remote location of the two parts is in accordance with the dispensing system illustrated in Fig. 1 wherein the auto-stop register may be selectively connected to any one of a number of meters located at different loading stations.

The meter 38 drives through suitable gearing 60 a shaft 62 which carries a cam 64. Associated with the cam are contacts 65, one of which is connected by wire 59 to the source of electric current 50 and the other of which is connected by wire 63 to the winding 66 of a time delay relay 67. The relay 67 has a movable contact 68 which is normally closed with a stationary contact 69, the movable contact 68 being connected to the wire 63. The fixed contact 69 is connected by wire 73 to a winding 70 of a relay 71 adapted to control a known type of clutch 72, which controls the drive between the motor 74 and the shaft 75. A suitable driving connection, such as a worm 76 carried by the shaft 75 and a worm gear 77 carried by a sleeve 78 surrounding shaft 28, transmits driving movement from the shaft 75 to the units wheel 20 of the register. The motor 74 operates continuously after the system is connected for operation, the motor 74 being connected to the source of electric current 50 by wire 79 and to the ground at 80.

If desired, a totalizer 82, such as shown in Fig. 3A, may be geared to the meter drive so that the person receiving the liquid delivered during a dispensing operation can observe at the loading station the amount dispensed.

The remote drive from the meter 38 to the register 10 is accomplished by the closing of the contacts 65 by the cam 64 once for each unit of measurement by the meter 38. This unit measurement may be of any desired quantity, such as a gallon or other suitable amount. When the contacts 65 are closed current is fed through the contacts from the source 50 through the coil 66 and to ground. Simultaneously, current is fed through the contacts 68, 69 to the coil 70 of the relay 71. The time delay characteristics of the relay 67 are such as to permit passage of current through the contacts 68, 69 for a time interval sufficient only to actuate the clutch controlled by relay 71 to move the lever 350 of the clutch against the bias of spring 351. This permits transmission through the clutch 72 of a driving movement from the motor 74 to the units wheel 20 sufficient only to advance the unit wheel one unit indication. The time delay relay 67, therefore, opens the contacts 68, 69 after the required time interval to open the circuit to relay 71 to release lever 350 to effect declutching operation of clutch 72 and thereby insures the transmission of unit measurements even though the cam 64 should come to rest in a position closing the contact 65.

The registering movement of the auto-stop register is responsive to the meter operation to control the actuation of the valves 40 and 42 to discontinue delivery at the end of a predetermined dispensing operation. In order to insure the cutting off of the flow at the end of a unit of measurement, however, the synchronizing circuit 61 is arranged to control jointly with the register the closing of the valve 42. This unit measurement control feature of the synchronizing circuit is accomplished by providing a second cam 84 on the shaft 62 to control a pair of contacts 85. These contacts are connected in the circuit 61 which is connected at one end to the source of current 50 and at the other end to the coil 46 of the valve 42. The cams 64 and 84 are disposed one ahead of the other so that the cam 64 is adapted to close the contact 65 prior to the opening by the cam 84 of the normally closed contacts 85. Thus the registering of each unit of measurement will be effected prior to the completion of the actual measurement of the unit.

When the last unit measurement for a predetermined quantity is registered on the units wheel 20, the main valve 40 being previously closed by opening of contacts 48, the follower 31 will move into the recess of the cam 21, thereby opening the contacts 58 to deenergize the circuit 51 leading to the coil 46 of the valve 42 prior to the actual completion of the measurement of the last unit. The coil 46, however, is not deenergized by the opening of the contacts 58 but is maintained energized by the normally closed contacts 85 until the meter has completed the unit measurement and brought the lobe 87 of the cam 84 into engagement with one of the contacts 85 and breaks the circuit. The opening of these contacts deenergizes the coil 46 and closes the valve 42 exactly at the completion of the last unit of measurement, thus stopping the meter 38 and stopping cam 84 in position to hold the contacts 85 apart to maintain valve 42 in closed position.

From the foregoing it will be seen that the system registers each unit of measurement while the unit of material is actually being measured. When the register reaches registration of a predetermined quantity, it operates to initiate stoppage of the system by deenergizing first the circuit 41 and then the circuit 51. The circuit 51 being in parallel with the synchronizing circuit 61 leaves the meter in control of the valve 42, the closing of which is thereby effected by the direct action of the meter. The register 10, having already completed its operation, is without further effect and the meter effects shutting of the valve precisely upon completion of the last unit measured by the meter.

This unit measurement feature of the invention is important in the accurate registration and control of the quantities dispensed. While the circuits 41 and 51 can be manually opened by releasing the switches 47 and 57 at any point in a dispensing operation, the meter will continue to operates to complete the unit measurement commenced thereby.

Referring back to Figs. 1, 3 and 3A, the auto-stop register and dispensing unit of the system described in connection with the simplified showing in Fig. 2 form parts of the larger system and where identical the parts are referred to by the same reference characters.

In Fig. 3 the drive shaft 75 from the motor 1 is shown connected to a second drive shaft 9 by gears 91 and 92. The shaft 95 carries worm 93, 94 and 96 to drive the auto-stop register 10 the visual register 12 and the printing whee 14 respectively. The auto-stop register 10 shown in more detail in Fig. 3 than in Fig. 2 an the driving sleeve 78 for the units wheel has gear 97 in mesh with the driving worm 93. Th shaft 28 is likewise provided with a handle 2 which may be manually actuated in a know: manner to preset the numeral wheels of the reg ister. The shaft 28, however, is now shown pro vided with an electrical locking means 100 whic when energized is adapted to lock the shaft 2 so that the setting of the numeral wheels canno be changed once the lock 100 is energized. Th lock 100 may comprise any suitable electro-mag netic locking arrangements, one form of this de vice being more particularly described in con nection with Fig. 7.

The visual register 12 is provided so that th amounts dispensed during a dispensing operatio can be readily determined. The printing wheel 14 are driven in any suitable manner in uniso with the corresponding wheels of the visual reg ister 12. For purposes of illustration the driv to the visual register 12 and the printing wheel 14 is shown transmitted from gears 101 and 10: through suitable friction clutches 103 and 104 t the units wheels driving sleeves 105 and 106 re spectively.

The printing mechanism of the billing machin includes in addition to the printing wheels 14, 112 disposed between the hammer and the print ing wheels. Suitable means are provided to sup port a roll of paper 115 which is fed between roll 116 and 118 to the frames 112.

The operation of the printing hammer 110, the resetting of the printing wheels and the feeding of the paper 115 are effected by a motor 120. The motor 120 has a drive shaft 121 which carries a mutilated gear 122, the teeth of which are adapted to mesh in successive order with a pair of gears 124 and 125. The gear 124 is carried by a shaft 126 having a cam 128. The hammer 110 is provided with an arm 130 having a roller 132 engageable by the cam 128 to raise the hammer 110 to cocked position and to release it at a proper time in the operation of the machine to effect the printing of a ticket.

The shaft 126 is also provided with a mutilated gear 134 which is adapted to drive a gear 135 to rotate the paper feeding roll 118 during the cocking movement of the hammer. The operative relationship of the printing mechanism will be described hereinafter in connection with the operation of the billing machine.

The gear 125 which is driven by one part of the rotation of the gear 122 is rotatably carried on a shaft 107 which extends through the sleeve 105 where, by known wheel pick-up means, such as that shown in the United States Patent No. 2,126,256 to Charles S. Hazard and William L. Marden, rotation of the shaft 107 is adapted to reset to zero the number wheels of the visual register 12. The number wheels of the register 12, and also the printing wheels 14, are, of course, suitably connected for counting operation by known transfer mechanism, such as described in connection with the auto-stop register 10.

The printing wheels 14 are reset by the motor 120 from the shaft 107 through a gear 140, a pinion 141 and a gear 142 carried on a shaft 108 which extends through the sleeve 106 to the wheels 14. As hereinafter described, the resetting of the visual wheels and the printing wheels by the motor 120 take place when the machine is conditioned for a dispensing operation and, when the dispensing operation is completed, another driving movement of the motor 120 effects the tripping of the printing hammer and a subsequent feeding of the paper 116.

The control of the operation of the billing machine is normally dependent upon the operation of a contact switch 150 associated with a switch actuating arm 152 of the selecting mechanism to be hereinafter described and a second contact switch 160. The contact switch 150 comprises two stationary contacts 153 and 154 and a movable contact 155 carried by a resilient leaf or stem 156, which is engageable by two control elements 157 and 158. The control elements extend through opposite walls of the switch box, the element 157 being movable by the actuating arm 152 of the selecting mechanism and the element 158 being under control of a cam 159.

The second contact switch 160 comprises a stationary contact 161 and a movable contact 162 carried by a resilient leaf or stem 162a and a pair of actuating elements 163 and 164. The element 163 is engageable by a rod 165 suitably mounted in a frame element 166 of the machine and engaged at the other end thereof by a cam 168 carried on the shaft 121 of the motor 120. The rod 165 is provided with a spring 169 which engages the frame 166 to bias the rod against the surface of the cam 168. The element 164 is engageable by an arm 171 of a bell crank 170, the other arm of which is connected by a rod 174 to an arm 175 of a bell crank 176 on which the follower 31 is supported. Thus when the auto-stop register is moved to change the position of the follower 31, the actuating element 164 is moved in one or another direction, as the case may be, in relation to the movable contact 162.

Before tracing the wiring connections of the switches 150 and 160, it is believed desirable next to describe the selective mechanism and the connected relationship of the wiring with respect to one of the loading stations.

In Fig. 3a the selective mechanism for the billing machine A is shown associated with a part of the selecting mechanism of the billing machine B to illustrate the interlocking connection therebetween and to one of the loading stations. As shown in Figs. 1 and 3a, the selecting mechanism of the billing machine A comprises four buttons 1, 2, 3 and 4. The button 1 comprises an elongated element 180 having a plurality of contacts which are associated with a corresponding number of stationary contacts. The inner ends of the elements 180 of the buttons 1 to 4 are adapted to engage an actuating member 182 suitably journaled in frame elements 183. The member 182 has on the other end thereof the actuating arm 152, and as shown in Fig. 3 the arm 152 is adapted to engage the switch element 157. The member 182 is provided with a spring 184 which returns the member and the actuated button to inactive position when the button is released.

Supported on the member 182 is a contact 181 adapted when the member 182 is actuated by a button to close with a contact 185 to complete a circuit for the lock 100 on the auto-stop register 10. The circuit may be traced from source 50 through wires 212, 213, 192, contacts 181, 185 and wire 194 to the lock and ground. Whenever the selecting mechanism is actuated the lock 100 is energized and prevents change in the presetting of the register.

Each button is provided with a roller 186 disposed between two controlling surfaces, the roller 186 of the button #1 being shown disposed between the surface of a stationary frame element 187 and the inclined surface of a sector 190 pivoted at 191. A series of such sectors are provided, one adjacent the other, depending upon the number of buttons, the lowermost button being disposed between one of the sectors and a frame element similarly as in the case of button #1. The sectors are restricted in movement by the frame members, so that only one roller 186 is movable to button actuated position at a time. This arrangement provides an interlock so that the billing machine can only be connected to one loading station at a time.

To maintain the button in the inner or actuated position once it is pressed, the element 180 is provided with a shoulder 196 engageable by a pawl 197 normally held out of engagement by a spring 198. To lock the button in actuated position, an electro-magnetic coil 199 is disposed adjacent the pawl, the coil being energized upon actuation of the button by circuit connections hereinafter described. The energization of the coil 199 urges the pawl 197 into locking position with the element 180 and maintains the element locked until the coil is deenergized or shorted.

Since the wiring connections for the buttons of a billing machine are the same, the description of the wiring connections of one of the buttons will suffice for the other buttons. Button #1 is provided with a series of contacts movable therewith to control the opening and closing of a number of circuits. The contacts are identified in Fig. 3a as 200, 201, 202, 203, 204, 205 and 206. The corresponding contacts of #1 button of the machine B are identified as 300 through 306. The source of power to these contacts is controlled by two sets of contacts 210 and 211 controlled by the auto-stop register 10 and interlocking circuits connecting contacts on the corresponding buttons of the billing machines of the system.

The contacts 210 are associated with the follower rack 54 and are closed when the followers 32, 33, 34 thereof are received in the recesses 27 of the cams 22, 23, 24 associated with the tens, hundreds and thousands numeral wheels. The contacts 211 are controlled by the bell crank arm 175 of the follower 31 associated with the units wheel 20. In other words, the contacts 210 are adapted to be opened when the auto-stop register reaches the last 10 units of registration of the predetermined amount for which it has been set. The contacts 211 remain closed during the last ten units of registration and are opened when the units wheel has reached zero position.

Following the circuit through the contacts 210 from the source of electric current 50, the current is supplied through wire 212, contacts 210, wires 214 and 215 and normally closed contacts 305 of the corresponding button #1 of machine B. This is one portion of the interlocking connection between the corresponding buttons of the billing machines and it extends from the wire 215 and the contacts 305 through a wire 307 to one of the contacts 200. The other of the contacts 200 is connected by a wire 216 to the manually actuatable switch 47 and thence to the coil 45 of the main valve 40. Thus, in order for the actuated button #1 to complete a circuit from the source of electricity 50 to the main valve 40, the corresponding button of machine B must be in its outer or inactive position.

The other portion of the interlocking connection may be traced from the control switch 150. The source of current 50 is connected to the movable contact 155 of the switch 150 through wires 212 and 218. Assuming that the auto-stop register 10 has just been preset so that the units wheel 20 is in the numerical position shown in Fig. 3, the contacts 211 will be closed. After a button has been pressed and the motor 120 has operated to reset the register 12 and the printing wheels 14, an operation which is performed quickly and while the button is manually pressed, the switch 150 will assume the position indicated in Fig. 5. The movable contact 155 will in this position be closed with stationary contact 154 and the current from the source 50 hereinbefore traced to the contact 155 will pass through the contact 154 and wire 220 to the contacts 211, thence through wires 221 and 222 to the contacts 306 of the machine B. Since the contacts 306 are closed when the button #1 of machine B is in its inactive position, the circuit continues through wire 308 to contacts 201, 202, 203 and 204.

From the foregoing it will be seen that in order for the contacts 200 through 204 of machine A to complete circuits to #1 loading station, the button #1 of the machine B must be in its inactive position. Likewise, in order for button #1 of machine B to complete circuit to #1 loading station, the button #1 of machine A must be in its inactive position. The interlocking control of the button #1 of machine B by button #1 of machine A is effected by the contacts 205 and 206. From the wire 214, a wire 224 connects one of the contacts 205 and the other contact thereof is connected by wire 225 to the contacts 300 of the machine B. This interconnection controls the circuit connection of contacts 300 through wire 316 to wire 216 and the manual switch 47 in control of the valve 40. From the wire 221, a wire 226 is connected to the contacts 206 which in turn are connected through wire 227 to the series of contacts 301 through 304. This completes the interconnection between two corresponding buttons of the two machines. The wires 214 and 221 are, of course, connected to the corresponding switch contacts of the auto-stop register of the machine B. The interconnection between corresponding buttons #1 of the two machines are the same for the other corresponding buttons of the two machines. Where more than two machines are provided each button of a machine controls the corresponding buttons of the other machines.

Having traced out the control of contacts 200 and 300 to the main valve 40, the other control contacts of buttons #1 of machines A and B will now be traced. From contacts 201 a wire 231 is connected to the manual control switch 57 which controls the coil 46 of the auxiliary valve 42. The corresponding contacts 301 of machine B are likewise connected by a wire 331 which is connected to the wire 231 for control of the auxiliary valve 42. Contacts 202 are connected by a wire 232 to lamp 16 adjacent #1 button and to a lamp 240 associated with the meter 38 so as to indicate at the machine which station is connected thereto and to indicate at the station which of the billing machines is connected thereto. The illumination of the lamp 240 also indicates that the loading station is now ready for a dispensing operation. A similar circuit 332 is connected between contacts 302 and a lamp 16B on machine B and a lamp 241 at the loading station. Contacts 203 are connected by a wire 233 to the motor 74 of the machine A. The motor as hereinbefore described in connection with the simplified showing of Fig. 2 is energized continuously during a dispensing operation under control of the machine A. Likewise, the contacts 303 of the machine B are connected by a circuit 333 to the driving motor of the machine B. Contacts 204 are connected by a wire 234 to contacts 235 under control of a cam 64a driven by the meter 38. From the contacts 235 a circuit 236 leads to the time delay relay 67 which controls the operation of the clutch actuating relay 71. A circuit 334 leads from the contacts 304 of the machine B through contacts 335 likewise controlled by the operation of the cam 64a to operate the clutch actuating relay of the machine B.

As previously described in connection with Fig. 2, each loading station is provided with a unit synchronizing circuit which is controlled by the meter of the loading station. In Fig. 3a the meter 38 is shown with a cam 84 which controls the contacts of the synchronizing circuit as described in connection with Fig. 2. The contact engaging relation of the cams 64a and 84 is staggered so that when a new unit measurement is commenced by the meter 38, the register controlling cam 64a is adapted to close the relay circuit prior to the completion of the unit measurement while the cam 84 is adapted to open the synchronizing circuit at substantially the termination of the unit measurement. As previously described, this relationship enables the auto-stop register to register each unit of measurement prior to the completion thereof and when it registers the last unit measurement of a predetermined amount for which the machine has been set, assuming that valve 40 is now closed, it opens the circuit 231. With the circuit 231 deenergized the valve 42 is then entirely under the control of the synchronizing circuit 61. Thus, when the synchronizing circuit is opened by the cam 84 the dispensing operation is completed at precisely the termination of the last unit of measurement.

Summarizing the operation of the system, it will be assumed that button #1 of machine A has just been pressed to its inner position thereby selectively connecting the machine A to the meter 38 of station #1. Also assume that the auto-stop register 10 has been preset to dispense five units or gallons of liquid and that the register 12 and the printing wheels 14 indicate 2500 units from the previous operation. Under this setting of the auto-stop register 10, it will be noted that the contacts 211 are closed while the contacts 210 remain open. If a larger number, such as 10, 100 or 1,000 gallons were to be dispensed, the register would then be preset to indicate the appropriate amount and both sets of contacts 210 and 211 would be in closed position since both sets of followers would then be in their outer positions. The initial actuation of the button actuated member 182 closes contacts 181, 185 to lock the auto-stop setting as previously described.

As shown in Figs. 3 and 3a, the actuating arm 152 has responded to the pressing of button #1 to move the element 157 against the stem 156. Since the element 158 is also urged against the stem 156, the stem is distorted so that contact 155 is moved out of engagement with stationary contact 154 (Fig. 4) to engagement with contact 153 (Fig. 3). In this position of the switch 150, a circuit is completed to the motor 120 from the source of power 50 through wires 212 and 218, contacts 155, 153 and wire 245 to the motor 120 and thence to ground at 246. The motor 120 is energized and drives the cam 159 until it moves to the position shown in Fig. 5 whereupon the element 158 is released and the stem 156 permitted to straighten thereby disengaging contact 153 and reengaging contact 154. The surface of the cam 159 is shaped to maintain this switching condition for a length of time to effect a motor driving movement of substantially 180°.

This rotation of the motor shaft 121 drives the mutilated gear 122 through 180° from the position shown in Fig. 3, that is, a sufficient amount to reset the register 12 and the printing wheels 14. The transfer of resetting movement to the visual register 12 is effected during engagement of the gear 122 with the gear 125 to effect rotation of the shaft 107. The transfer of resetting movement to the printing wheels 14 is effected from shaft 107 through gears 140, 141 and 142 to the shaft 108. The pick-up connections between the shafts 107 and 108 and the number wheels thereon for resetting these numeral wheels to zero are of known construction, such as is shown in the United States Patent 2,126,256, August 9, 1938, to Charles S. Hazard and William L. Marden.

Upon completion of the resetting movement of the motor 120, the cams 159 and 168 assume the position shown in Fig. 5. The cam 168 moves the rod 165 downwardly urging the element 163 against the movable contact 162 of the switch 160 to insure the disengagement of the contacts 161, 162. The position of the movable contact 155 in engagement with the stationary contact 154 (Fig. 5) conditions the system for registering operation with the loading station corresponding to the button which has been pressed. The button is held in pressed position by the electro-magnet 199 which is energized by the circuit traceable from the source of power 50 through wires 212, 218 and 256, electro-magnet 199, wires 257 and 245, motor 120 and ground 246. The resistance of the electro-magnet 199 is such that insufficient current will flow through the circuit to drive the motor 120. Thus, the electro-magnet is adapted to force the pawl 197 into the recess 196 against the action of the spring 198 to hold the button in pressed position whenever the button is pressed. When, however, the motor 120 is energized by either of the circuits including the switch contacts 155, 153 (Fig. 3), contacts 161, 162 or manual switch 260, the circuit to the electro-magnet 199 is in effect shorted, resulting in a sufficient decrease in current for the spring to overcome the effect of the electro-magnet and release the button.

The manual switch 260 interposed between wires 218 and 269 enables an attendant to print a ticket should an amount less than that for which the machine is set be desired after an operation has once been started. For example, should the driver decide to take a smaller amount than first requested, he may stop delivery by opening switches 47 and 57. The closing of valves 40 and 42, however, will not stop delivery at a fraction of a unit, the delivery continuing under control of the synchronizing circuit 61 until the unit of measurement is complete. Thereafter, the ticket may be issued by momentarily closing switch 260 to energize the motor 120.

With the button #1 of machine A in the position shown in Fig. 3a, the contacts 200 through 204 are closed and the contacts 205 and 206 are open. The closed contacts connect machine A to loading station #1 and the two open contacts prevent machine B from being connected to the same loading station. Since the auto-stop register is set for five units, the contacts 210 are open so that no current will flow through contacts 200 to the valve controlling coil 46 when the switches 47 and 57 are closed. Current, however, will flow to contacts 201, 202, 203 and 204 since the contacts 155, 154 (Fig. 5), contacts 211 (register 10) and contacts 306 are closed. The circuit of contact 201 is thereby completed down to the manual switch 57; the circuit of the contact 202 is completed through wire 232 to the lamps 16 and 240 which are thereby illuminated; the circuit of contacts 203 is completed through wire 233 to the driving motor 74 of the billing machine; and the circuit of contacts 204 is completed through wire 234 to the cam controlled contacts 235.

When the driver is ready to accept delivery, he may do so by actuating the switch button 17 thereby completing the circuit through contacts 57 to the electro-magnetically controlled valve 42 which is thereupon opened allowing liquid to flow through the meter 38. The cam 64a closes the contacts 235 once during each unit measurement to transmit an electrical current through the wire 236 to the relays 67 and 71 to actuate the clutch 72. As previously described, each actuation of the clutch 72 effects a driving movement to the shaft 75 sufficient to move the number wheels of the auto-stop register 10, the visual register 12 and the printing wheels 14 one unit registration. When the auto-stop register has been driven sufficiently to return the units wheel 20 from the 5th position to zero, thereby indicating a registration of the five units of liquid, for which the machine was preset, the follower 31 is received in the recess 27 of the units wheel cam 21 and the contacts 211 opened and the contacts 266 closed. The opening of contacts 211 deenergizes the circuit leading to the contacts 201 through 204. This deenergizes the circuit to the manual switch 57, the circuit to the lamps 16 and 240, the circuit to the motor 74, and the circuit to the contacts 235. No further registration for this operation is now possible on the billing machine. The valve 42, however, is not immediately closed since the synchronizing circuit 61 is still closed and until the meter has moved to a position to open the contacts 85, flow will continue. When the meter moves to the position where the last unit of measurement is complete, the contacts 85 will be opened by the cam 84 and the coil 46 will be deenergized to close the valve 42.

The closing of the contacts 266 and contacts 161, 162 by movement of the follower 31 completes a circuit from the source of power 50 through wires 212, 218 and 267, contacts 266, wire 268, contacts 161, 162, and wire 269 to the motor 120. The motor is thereupon energized for a partial rotation to drive the mutilated gear 122 through an arc of 180° from the position to which it was moved during the resetting operation of motor 120, thus returning the gear 122 to the position shown in Fig. 3. The gear 122 drives the gear 124 during this return movement to drive shaft 126 which effects, through movement of the cam 128, roller 132 and arm 130, the tripping of the printing hammer 110 to impress the amount indicated by the printing wheels 14 upon paper disposed in the frames 112. The continued movement of the gear 124 and shaft 126 brings the mutilated gear 134 into driving engagement with the pinion 135 carried on the shaft 119 of the feeding roll 118. This movement feeds paper through the printing frames 112, thereby issuing the printed portion and replenishing the frame with a new ticket portion. The ticket portion thus issued and bearing the record of the amount dispensed may be severed from the strip of paper.

The printing mechanism, of course, may include printing elements other than the wheels 14 to indicate the date, the loading station from which the dispensing operation has taken place and any other data that may be desirable.

It is also possible to provide a second set of registering wheels and printing wheels, similar to 12 and 14, to indicate and to print on the ticket the total cost of the fluid delivered. These cost-indicating wheels would be driven from shaft 95 through a variable-ratio gear box, the driving ratio being adjustable to accord with the unit price of the fluid being dispensed.

The driving movement of the motor 120 moves the cams 158 and 168 to the position indicated in Fig. 3 whereupon the element 158 is urged inwardly against the stem 156. The electro-magnet 199 having been shorted by the energization of the motor 120 releases the button, thereby releasing the element 157, so that the contact 155 is moved to the position shown in Fig. 4. In this position the circuits of the system are deenergized, the contact 154 which is now engaged by the contact 155 being connected to a circuit which includes the wire 220 connected to the open contacts 211.

In Fig. 7 is shown in longitudinal section one embodiment of the electromagnetic grip 100 which is constructed to cooperate with shaft 28 of the auto-stop register 10 to prevent rotation of this shaft and change in the setting of the auto-stop register after the element 180 identified with the selected loading station in a selected billing machine is actuated.

The shaft 28 passes through bearings formed in the bosses 501 and 503 provided respectively in the end closing plate 505 and in the end wall 506 of the casing 507 of the device. In this embodiment the casing 507 is of cylindrical form with the end wall 506 integral therewith. To this casing the end closing plate 505 is fastened by screws 509 entering the periphery of this plate through the cylinder wall of casing 507. Within the inner bore of the casing 507 is a spool 511 fastened to the casing by screws 512. This spool carries the coil 513 of a solenoid the terminals 515 of which pass out through the wall of the casing 507 through insulating bushings 516. The terminals 515 are connected respectively to ground and to the contact 185 as shown in Figs. 3 and 3a.

In holes drilled in bosses 517 formed on the end plate 505 a plurality of pins 518 are rigidly fastened and extend generally parallel to the axis of the shaft 28. Preferably, these pins are formed of non-magnetic material. Co-axially with the shaft 28 an armature 519 of annular cylindrical form is supported on the pins 518, this armature being provided with holes extending therein parallel to the axis of the armature which fit slidably on the pins 518 to provide for movement of the armature in the direction parallel to the axis of the shaft 28. At the right hand end of the armature in Fig. 7 the armature is provided with teeth 521 adapted to cooperate as a clutch with the teeth 523 of a cooperating clutch member 525 fitted upon the shaft 28 and keyed thereto by the key 526. The clutch member 525 may be of cylindrical form and cup shaped to receive a compression spring 527 which bears against the end wall of the cup and against the end of the armature 519 to bias this armature toward the left in Fig. 5 to the position shown where the teeth 521 and 523 are disengaged.

It will be noted that the armature 519 is of such length and is so positioned relative to the central plane of the solenoid coil 513 that upon energization of this coil effected by closing of the contact 185 the armature 519 will be drawn toward the right substantially to a position symmetrical with respect to the central plane of the solenoid coil 513. In such movement toward the right the teeth 521 and 523 of the clutch members will be engaged with each other. Since the casing 507 of the electromagnetic grip 100 is fixed against rotation, it will be apparent that upon energization of the solenoid 513 the shaft 28 will be held against rotation if operation thereof by the handle 26 fastened thereto is attempted. Thus, when a selector element 180 of a given billing machine with which the auto-stop 10 is associated is pressed to select the loading station and meter to be connected to the given billing machine and its registers, the auto-stop having been previously set to the amount to be dispensed, thereafter and until the auto-stop has returned to zero thereby releasing the actuated element 180 the setting of the auto-stop may not be changed by the operation of the handle 26. The device shown in Fig. 7 may be variously designed to cooperate with the auto-stop register and the means actuated by elements 180 to produce the result of preventing change in the setting of the auto-stop register during the operation thereof in a dispensing operation of the apparatus.

From the foregoing description it will be readily apparent that the dispensing apparatus of this invention has particular utility for use in loading yards having a plurality of loading stations. It will also be apparent that many of the features of the invention are useful per se and with apparatus other than the dispensing system disclosed. It is recognized, therefore, that many modifications and adaptations of the various features are possible without departing from the invention. It will, therefore, be understood that the forms of the invention herein illustrated and described are intended to be illustrative only and not to limit the scope of the appended claims.

We claim:

1. Fluid dispensing apparatus comprising an auto-stop register, a fluid meter, said register being presettable for an amount to be dispensed, means responsive to operation of the meter to effect actuation of said register, a valve to control the flow of fluid through said meter, means insuring closing of said valve precisely on completion of measurement of the last unit of the fluid to be dispensed, including a pair of electrical circuits for controlling actuation of said valve, one of said circuits being under the control of said register and the other of said circuits being under the control of said meter, means actuated by said register for inactivating said register controlled circuit in advance of completion of measurement of the last unit of fluid to be dispensed through said meter, and contacts in said meter controlled circuit adapted to be actuated by said meter to inactivate said meter controlled circuit on completion of measurement of said last unit of fluid.

2. Fluid dispensing apparatus comprising a presettable register, a fluid meter, means including an electrically operated valve to control the dispensing of fluid, first and second circuits to jointly control said valve, means in the first circuit actuatable by said meter at the completion of each unit measurement to deenergize said first circuit, means in the said second circuit actuatable by said register to deenergize said second circuit when the last unit of a preset amount set up thereon has been registered, and said valve being movable to closed position only when said second circuit is deenergized at the same time that said first circuit is in a deenergized state.

3. Fluid dispensing apparatus comprising a register, a fluid meter, means responsive to operation of said meter during the measurement of a unit of fluid thereby to effect actuation of said register by an increment of movement corresponding to one unit of measurement, means including an electrically operated valve to control the dispensing of fluid, first and second circuits to jointly control said valve, means in the first circuit actuated by said meter at the completion of each unit measurement to deenergize said first circuit, means in said second circuit actuatable by said register to deenergize said second circuit when a predetermined count has been registered, and said valve being movable to closed position only when said second circuit is deenergized at the same time that said first circuit is in a deenergized state.

4. Fluid dispensing apparatus comprising a presettable register, a fluid meter, means including a driving motor and a clutch to drive said register, a relay to operate said clutch to establish a driving relation between said motor and said register, means operated by said meter to energize said relay during the measurement of a unit of fluid, an electrically controlled valve for the fluid, a first circuit for controlling the valve and deenergizable by said meter only at the completion of each unit measurement, a second circuit for controlling said valve and deenergizable by said register only when a desired amount is registered thereon, and said valve being movable to closed position only when said second circuit is deenergized at the same time that said first circuit is in a deenergized state.

5. In a fluid dispensing apparatus, a presettable register, a fluid meter, a valve controlling flow of fluid through said meter, means effective when activated for holding said valve against movement to closed position, means controlled by said register and means controlled by said meter each effective for activating said holding means during the metering operation, said register controlled means being rendered inactive in response to movement of said register to a predetermined registration, and said meter controlled means being momentarily rendered inactive during metering operation on completion of each incremental operation of said meter corresponding to a unit measurement thereby.

6. In a fluid dispensing apparatus comprising a register, a fluid meter, and a valve to control the flow of fluid through said meter; in combination, a motor for driving said register, a clutch operable intermittently to establish a driving connection between said motor and said register to actuate said register in step-by-step manner, each step movement of said register corresponding to a unit measurement by said meter and being timed to be concluded in advance of completion by said meter of the unit measurement corresponding thereto, means responsive to operation of said meter to actuate said clutch, means for holding said valve in open position, means controlled by said meter for normally locking said holding means against release during the metering operation, and means responsive to operation of said meter for inactivating said meter controlled means momentarily each time said meter completes measurement of a unit of the fluid being dispensed.

7. Fluid dispensing apparatus comprising a presettable register, a fluid meter, means including a driving motor to drive said register, a relay to control said motor, means operated by said meter to energize said relay so as to drive said register intermittently in step-by-step manner, one step for each unit of fluid measured in said meter, an electrically controlled valve for the fluid to be passed through the meter, a first circuit for controlling said valve and deenergizable by said meter only at the completion of each unit measurement, a second circuit for controlling said valve and deenergizable by said register only when a desired amount has been registered thereon in said step-by-step manner, said valve being movable to closed position only when said second circuit is in a deenergized state at the same time that said first circuit is in a deenergized state.

8. Fluid dispensing apparatus according to claim 7 in which a time delay element is connected to said relay to effect energization thereof for a time only sufficient to register a complete unit in each step and then to effect deenergization thereof.

9. In a fluid dispensing apparatus comprising a register, a fluid meter, and a valve to control the flow of fluid through said meter, in combination, means for driving said register intermittently in step-by-step manner, each step movement of said register corresponding to a unit measurement by said meter and being timed to be concluded not later than completion by said meter of the unit measurement corresponding thereto, means responsive to the operation of said meter for controlling operation of said register driving means, means for holding said valve in open position, means controlled by said meter for normally locking said holding means against release during the metering operation, and means responsive to operation of said meter for inactivating said meter controlled means momentarily each time said meter completes measurement of a unit of the fluid being dispensed.

10. Fluid dispensing apparatus comprising a presettable register, a fluid meter, means for driving said register intermittently in step-by-step manner, one step for each unit of fluid measured by said meter, means operated by the meter for controlling operation of said register driving means, a valve for controlling the flow of fluid through said meter, means activatable by said meter and operatively connected to said valve to control said valve and deactivatable by said meter only at the completion of each unit of measurement, means activatable by said register and operatively connected to said valve to control said valve and normally deactivatable by said register only when a desired amount has been registered thereupon in step-by-step manner, said valve being movable to closed position only when said means activatable by said register is in a deactivated state at the same time said means activatable by said meter is in a deactivated state.

CHARLES S. HAZARD.
JOHNSON SHIPMAN.

REFERENCES CITED

The following references are of record in the file of this patent:

UNITED STATES PATENTS

| Number | Name | Date |
|---|---|---|
| 790,361 | McDonnell | July 5, 1905 |
| 806,722 | Wood | Dec. 5, 1905 |
| 1,001,409 | Jennings | Aug. 22, 1911 |
| 1,759,396 | Granberg | May 20, 1930 |
| 1,875,437 | Friden | Sept. 6, 1932 |
| 1,876,512 | Pfening | Sept. 6, 1932 |
| 1,953,328 | Woolley | Apr. 3, 1934 |
| 2,014,572 | Julius et al. | Sept. 17, 1935 |
| 2,049,634 | Troutman | Aug. 4, 1936 |
| 2,056,690 | Slye | Oct. 6, 1936 |
| 2,060,674 | Hicks | Nov. 10, 1936 |
| 2,116,778 | Brayer | May 10, 1938 |
| 2,213,278 | Hazard | Aug. 30, 1940 |
| 2,227,830 | Hazard | Jan. 7, 1941 |
| 2,250,326 | Carroll | July 22, 1941 |
| 2,379,785 | Bugg | July 3, 1945 |

FOREIGN PATENTS

| Number | Country | Date |
|---|---|---|
| 12,907 | Great Britain | June 4, 1907 |
| 431,644 | Great Britain | July 12, 1935 |